United States Patent
Rosefsky

(12) 
(10) Patent No.: US 6,480,140 B1
(45) Date of Patent: Nov. 12, 2002

(54) APPARATUS AND METHOD FOR PROVIDING A DECEPTION RESPONSE SYSTEM

(76) Inventor: Jonathan B. Rosefsky, 251 W. Montgomery Ave., Haverford, PA (US) 19041

( * ) Notice: Subject to any disclaimer, the term of this patent is extended or adjusted under 35 U.S.C. 154(b) by 0 days.

(21) Appl. No.: 09/877,806

(22) Filed: Jun. 8, 2001

Related U.S. Application Data

(60) Provisional application No. 60/210,371, filed on Jun. 9, 2000.

(51) Int. Cl.[7] ............................. G01S 7/38; H04K 3/00
(52) U.S. Cl. ............................ 342/14; 342/13; 342/52; 342/53; 342/54; 102/206; 102/211; 102/213; 102/214; 455/1
(58) Field of Search ..................... 342/5–20, 52–58, 342/82, 89, 175, 192–195, 357.01–357.17, 61, 65; 102/206, 211, 212–214; 455/1; 244/3.1, 3.15, 3.16–3.19

(56) References Cited

U.S. PATENT DOCUMENTS 3,852,747 A * 12/1974 Morand ...................... 342/15
4,164,741 A * 8/1979 Schmidt ...................... 342/15
4,309,704 A * 1/1982 Anderson .................... 342/15
5,153,594 A * 10/1992 Moffat ........................ 342/15

* cited by examiner

Primary Examiner—Bernarr E. Gregory
(74) Attorney, Agent, or Firm—Roberts Abokhair & MArdula, LLC

(57) ABSTRACT

The present invention is to a method and system for providing protection from an EMS-targeted weapon by providing an appropriate spoofed EMS signal to cause an EMS-targeted weapon to determine an apparent object distance sufficiently close to the EMS-based targeting threat to nullify the weapon. In a first embodiment, the EMS-based targeting threat uses reflected EMS emissions, such as RADAR, to target the object the apparent object distance nullifies the weapon by falling within a weapon-safety lockout distance determined by a fire control system of the targeting threat. In another embodiment, the EMS-based targeting threat uses EMS signals from an external source, such as GPS, to target a position of the object and the apparent object distance nullifies the weapon by causing premature detonation at a safe standoff distance from said object.

10 Claims, 2 Drawing Sheets

APPARATUS AND METHOD FOR PROVIDING A DECEPTION RESPONSE SYSTEM

RELATED APPLICATIONS

This application claims the benefit of U.S. Provisional Application Ser. No. 60/210,371, filed Jun. 9, 2000, and incorporated herein by reference in its entirety.

FIELD OF THE INVENTION

The present invention is drawn to electromagnetic spectrum (EMS) modification to cause munitions-targeting systems to malfunction. More specifically, the present invention allows a targeted object to use known active spoofing techniques to appear sufficiently close to a munitions-targeting means so as to defeat its effectiveness. In one mode, appearing sufficiently close to a hostile fire control system causes safety interlock systems to prevent firing or arming of munitions. In another mode, appearing sufficiently close to GIS-targeting means causes premature activation of the munitions.

BACKGROUND INFORMATION

Military craft, heavy weapons and installations generally try to be protected from detection. However, if detected or incapable of being hidden (i.e. due to known location of a ground installation), they must be protected from being accurately targeted for destruction; if targeted, they must be protected from launch and contact by weapons such as bombs, rockets or pulsed high energy waves or beams of disablement/destruction.

Stealth aircraft and stealth naval vessels have been or are being developed. The present invention would complement programs already focusing on optimization of external shape, heat signatures, reduced RADAR cross-sectional area, electronic decoys, electronic jamming, chaff, flares, etc.

Additionally, civilian craft and installations increasingly need protection from simpler munitions from terrorists and rogue nations.

BRIEF SUMMARY OF THE INVENTION

The primary purpose of this invention is protection of military and civilian installations, equipment and personnel against accurate targeting by hostile forces and terrorists during combat or surveillance. Installations include, but is not limited to, airports, bases, manufacturing facilities, buildings and landmarks. Equipment includes, but is not limited to, items such as aircraft or missiles, spacecraft, naval vessels, and land materiel such as tanks or mobile missile launchers.

In brief, the invention embodies a system configured to analyze and respond to incoming EMS detection, tracking, or targeting signals, including ambient or specific light waves and GIS targeting means such as GPS signals from satellites, and in turn to produce a spoofing response wave in the EMS. The spoofed EMS response signal makes it look as if the target vehicle or object is much closer than it is in reality.

In one embodiment, the effect of the spoofed signal is to make the target appear so close to the targeting location that the targeting entity will not allow launch or deployment of munitions in order to prevent damage to itself, this is commonly referred to as a safety lockout or standoff and is used in virtually all fire control systems for weaponry.

In another embodiment that is primarily useful for geographically-fixed locations, the effect of the spoofed signal is to make the target appear sufficiently close to the munition so as to cause premature detonation at a safe standoff distance.

It is an object of the invention to provide spoofing EMS signals to reduce the effectiveness of targeted munitions.

It is a further object of the invention to deceive tracking or targeting systems by returning spoofed signals, such as Doppler shifted signals, so as to appear closer.

It is a further object of the invention to deceive weapon-targeting systems by returning spoofed signals so as to appear sufficiently close to the weapon-targeting system to activate the system's safety lockouts.

It is a further object of the invention to deceive weapon-targeting systems by returning spoofed signals so as to appear sufficiently close to cause premature detonation at a safe standoff distance.

DETAILED DESCRIPTION OF THE INVENTION

No military or civilian installation, craft, or vessel is invisible. Unless detection and targeting is solely by human visual acquisition, it is possible to design electronic methods of deceiving and/or incapacitating detection equipment.

Figure 1:
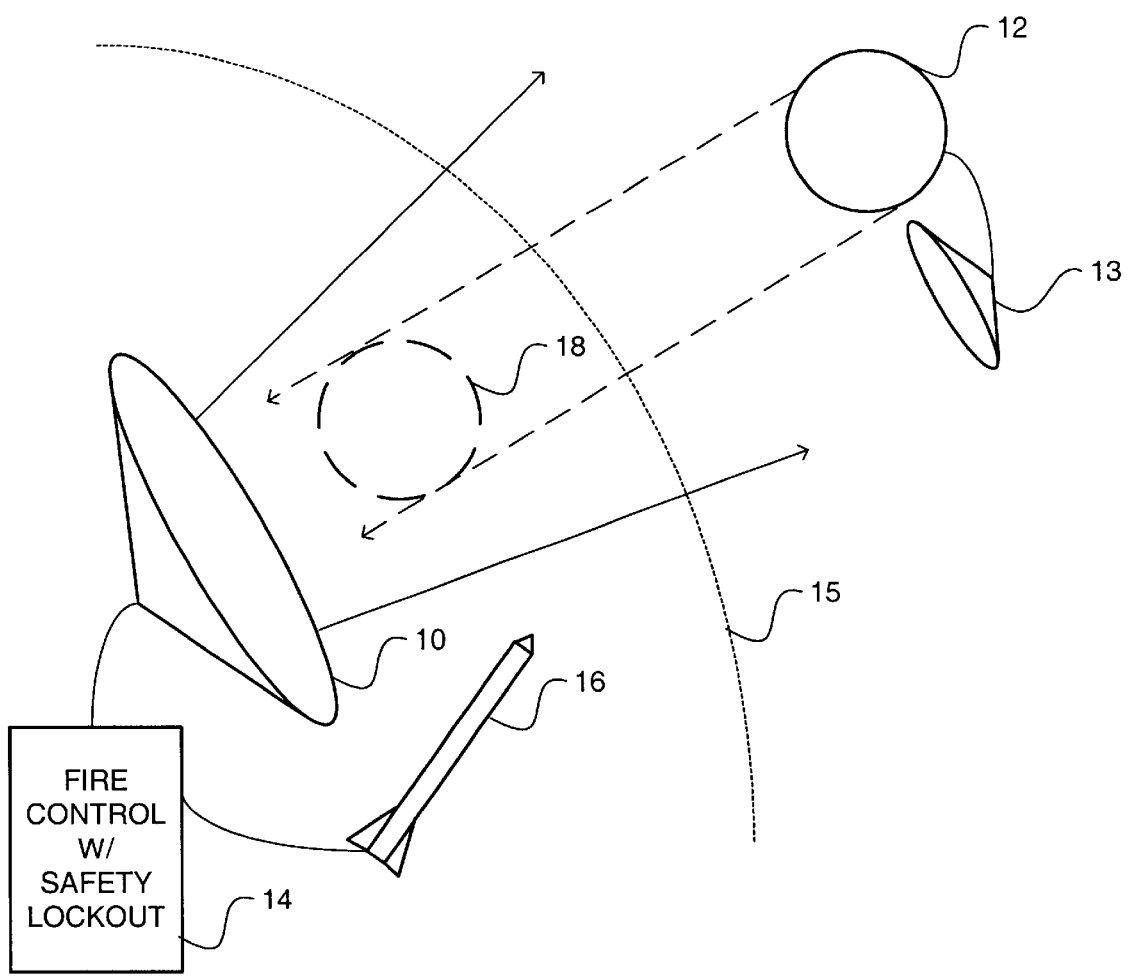
FIG. 1 illustrates a first embodiment of the invention incoming EMS signals are returned in a manner to spoof a location sufficiently close to the targeting location so as to cause fire control lockout.

The present invention applies to installations, vessels, craft, or equipment moving in air, space, water, or on land—such as aircraft, missiles, spacecraft, naval vessels, and land-based movable equipment—and even stationary facilities and objects. It embodies a system configured to spoof targeting signals. In a first mode, as illustrated in FIG. 1, the system on a target 12 is configured with means 13 to analyze and respond to incoming detection/tracking/targeting signals from a hostile entity, such as RADAR 10, and in turn to produce a spoofing response "wave" in the EMS in a known manner.

The spoofed response signal makes the apparent target 18 appear so much closer than it is in reality that the fire control system 14 of the hostile entity is at least momentarily locked out due to believing that the targeted object is not a safe enough distance 15 from the targeting source to prevent self-inflicted damage if weapon 16 is launched. Even if the spoofing signal is recognized, the momentary delay will at least allow time for the deployment of other countermeasures, such as jamming, decoys, chaff, IR flares, etc.

Figure 2:
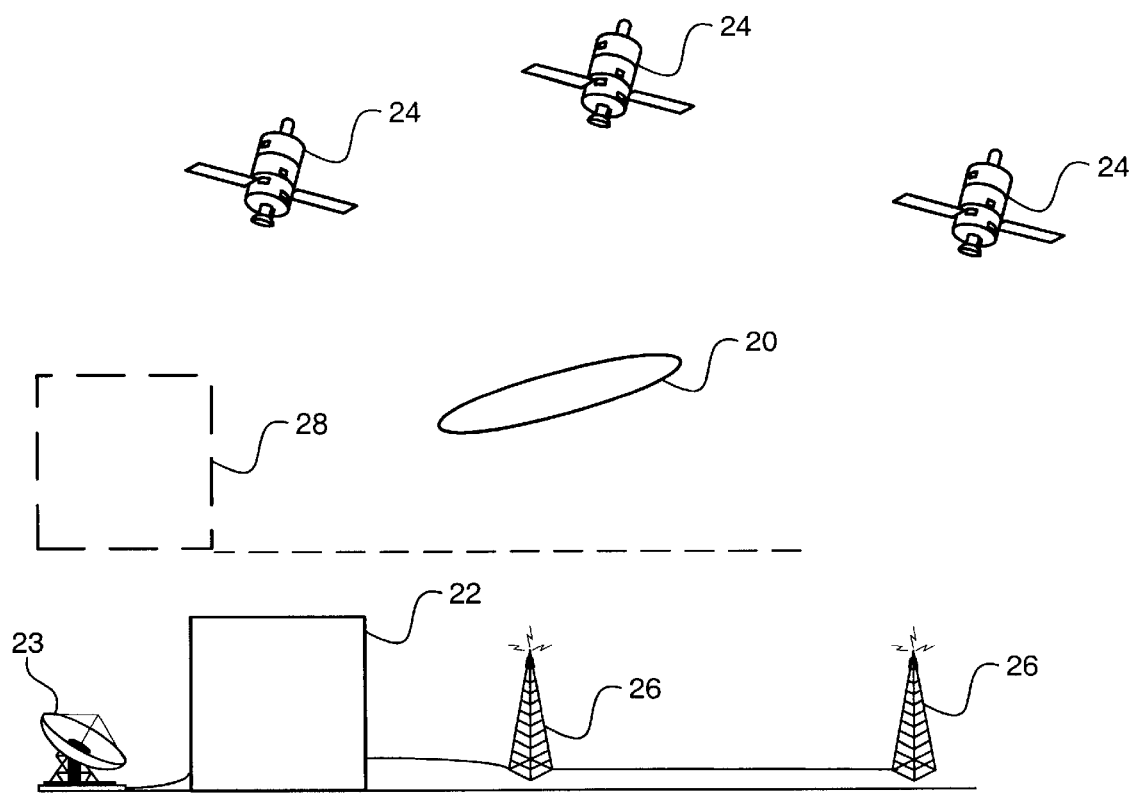
FIG. 2 illustrates another embodiment of the present invention wherein incoming EMS signals are modified to appear sufficiently close to a munition so as to cause premature detonation at a safe standoff distance.

In a second embodiment illustrated in FIG. 2, weapons or munitions 20 that rely on GIS-based targeting, such as from RF signals received from global positioning satellites (GPS) 24 to target a position 22 are detected by means 23 and thwarted through use of the present invention. The GPS targeting signal is spoofed by GPS spoofing signals from transmitters 26 in a known manner, such as through dGPS-type transmitters issuing Doppler-shifted signals. The spoofed GPS signals cause the weapon 20 to target a false position 28 at a safe standoff distance. Although GPS, as employed by the U.S. armed forces, employs an encrypted, anti-spoofing Y-code, the P-code available to all others can still be spoofed in specific locations to thwart threats such as terrorist attacks. Although spoofing is generally considered a malicious threat to the safety of aircraft, etc., its unique application in the present invention is beneficial to society and can provide localized safety to a specific type of threat.

Although described herein with respect to specific embodiments, the present invention is not meant to be so limited since other EMS-based targeting technologies such as laser, IR, microwave, etc. can clearly replace RADAR and likewise be spoofed in known manners. Additionally, EMS-based positioning systems other than GPS, such as GLONASS, LORAN, laser-guidance (laser illumination), RF-triangulation of known emitters (passive detection) etc. can also be spoofed in known ways. Hence, the scope of the present invention is limited only by the appended claims.

I claim:

1. A method of providing protection from an EMS-targeted weapon, comprising determining an EMS-based targeting threat to an object;

providing an appropriate spoofed EMS signal to cause an EMS-targeted weapon to determine an apparent object distance sufficiently close to said EMS-based targeting threat to nullify said EMS-targeted weapon.

2. The method of claim 1, wherein said EMS-based targeting threat uses reflected EMS emissions to target said object; and said apparent object distance nullifies said EMS-targeted weapon by falling within a weapon-safety lockout distance determined by a fire control system of said EMS-based targeting threat.

3. The method of claim 2, wherein said EMS emission is selected from the group consisting of RADAR, laser, microwaves, and IR emissions.

4. The method of claim 1, wherein said EMS-based targeting threat uses EMS signals from an external source to target a position of said object; and said apparent object distance nullifies said EMS-targeted weapon by causing premature detonation of said weapon at a safe standoff distance from said object.

5. The method of claim 4, wherein said EMS signal from an external source is comprised of a signal selected from the group consisting of GPS signals, GLONASS signals, LORAN signal, laser illumination, and RF-triangulation of known emitters.

6. A system for providing protection from an EMS-targeted weapon, comprising means for determining an EMS-based targeting threat to an object;

means for generating an appropriate spoofed EMS signal to cause an EMS-targeted weapon to determine an apparent object distance sufficiently close to said EMS-based targeting threat to nullify said EMS-targeted weapon.

7. The system of claim 6, wherein said EMS-based targeting threat is of a type that uses reflected EMS emissions to target said object;

said EMS-based targeting threat has a fire control system with a weapon-safety lockout distance; and said apparent object distance is of a distance that nullifies said EMS-targeted weapon by falling within said weapon-safety lockout distance.

8. The system of claim 7, wherein said EMS emission is selected from the group consisting of RADAR, laser, microwaves, and IR emissions.

9. The system of claim 6, wherein said EMS-based targeting threat is of a type that uses EMS signals from an external source to target a position of said object for detonation; and said apparent object distance is located at a safe standoff distance from said object to nullify said EMS-targeted weapon by causing premature detonation.

10. The system of claim 9, wherein said EMS signal is an external source comprised of a signal selected from the group consisting of GPS signals, GLONASS signals, LORAN signal, laser illumination, and triangulated known RF-emitters.

* * * * *